United States Patent
Rossato et al.

(10) Patent No.: US 9,598,181 B2
(45) Date of Patent: Mar. 21, 2017

(54) DEVICE FOR FASTENING A FLUID TRANSPORT CIRCUIT TO AN ELEMENT OF THE STRUCTURE OF AN AIRCRAFT AND RELATED AIRCRAFT

(71) Applicant: AIRBUS OPERATIONS, Toulouse (FR)

(72) Inventors: Robert Rossato, Sainte Foy d'Aigrefeuille (FR); Alexis Courpet, Fronton (FR)

(73) Assignee: Airbus Operations (SAS), Toulouse (FR)

( * ) Notice: Subject to any disclaimer, the term of this patent is extended or adjusted under 35 U.S.C. 154(b) by 689 days.

(21) Appl. No.: 13/688,851

(22) Filed: Nov. 29, 2012

(65) Prior Publication Data

US 2013/0161940 A1 Jun. 27, 2013

(30) Foreign Application Priority Data

Nov. 30, 2011 (FR) .................................... 11 60929

(51) Int. Cl.
*F16L 3/12* (2006.01)
*B64D 47/00* (2006.01)
*B64D 45/02* (2006.01)

(52) U.S. Cl.
CPC ............ *B64D 47/00* (2013.01); *B64D 45/02* (2013.01); *F16L 3/1222* (2013.01)

(58) Field of Classification Search
USPC ..... 285/123.1, 123.3, 123.6, 123.12, 123.14, 285/124.1, 124.3, 136.1, 141.1, 62, 63, 285/123.4; 248/56, 58; 361/215
See application file for complete search history.

(56) References Cited

U.S. PATENT DOCUMENTS

| | | | | |
|---|---|---|---|---|
| 5,966,932 A * | 10/1999 | Yahagi | ............................ | 60/322 |
| 6,406,066 B1 * | 6/2002 | Uegane | ...................... | 285/124.1 |
| 6,513,838 B2 * | 2/2003 | Poehler | .................. | F16L 39/005 |
| | | | | 285/123.15 |
| 7,437,952 B2 * | 10/2008 | Carns | ........................ | G01F 1/10 |
| | | | | 73/861.77 |
| 8,003,014 B2 * | 8/2011 | Breay | ..................... | B64D 37/32 |
| | | | | 174/137 R |

(Continued)

FOREIGN PATENT DOCUMENTS

| FR | WO 2011007100 A2 * | 1/2011 | .............. | B64D 45/02 |
|---|---|---|---|---|
| FR | 2978521 A1 * | 2/2013 | .............. | F16L 25/12 |

*Primary Examiner* — David E Bochna
(74) *Attorney, Agent, or Firm* — Nixon & Vanderhye P.C.

(57) ABSTRACT

A fastening device (10) is disclosed for attaching a fluid transport circuit to an element of a structure of an aircraft, with the fluid transport circuit containing two portions (23, 42), each of which is made up of an external tube (22, 44) positioned around an internal tube (21, 43). The fastening device (10) is positioned at a connection (40) between the two portions (23, 42) of the fluid transport circuit, and contains a body (26) with a plate (27) to attach the fastening device (10) to an element (61) of the structure of the aircraft. The body (26) provides at least one sealed connection between the external tubes (22, 44) of the two portions (23, 42) and a support system provides a constant radial clearance between the internal tubes (21, 43) and the external tubes (22, 44) of the two portions (23, 42) of the fluid transport circuit.

9 Claims, 4 Drawing Sheets

(56) References Cited

U.S. PATENT DOCUMENTS

| | | | | |
|---|---|---|---|---|
| 8,172,272 B2* | 5/2012 | Petit | .................. | F16L 39/005 |
| | | | | 285/123.15 |
| 8,562,027 B2* | 10/2013 | Barre | .................. | F16L 25/01 |
| | | | | 285/223 |
| 8,894,014 B2* | 11/2014 | Yonezawa | .............. | B64D 45/02 |
| | | | | 244/1 A |
| 8,947,846 B2* | 2/2015 | Courpet | ................ | B64D 45/02 |
| | | | | 361/215 |
| 9,248,901 B2* | 2/2016 | Petit | .................. | B64C 3/187 |
| 9,322,256 B2* | 4/2016 | Wright | ................ | E21B 36/04 |
| 2004/0080159 A1* | 4/2004 | Schroeder et al. | ........... | 285/205 |
| 2007/0051406 A1* | 3/2007 | Carns | ................ | F16K 1/22 |
| | | | | 137/312 |
| 2010/0001512 A1* | 1/2010 | Breay | ................ | B64D 37/32 |
| | | | | 285/50 |
| 2010/0122749 A1* | 5/2010 | Bouleti | ................ | A62C 3/08 |
| | | | | 138/177 |

\* cited by examiner

DEVICE FOR FASTENING A FLUID TRANSPORT CIRCUIT TO AN ELEMENT OF THE STRUCTURE OF AN AIRCRAFT AND RELATED AIRCRAFT

This application claims priority to France Application No. 11 60929 filed Nov. 30, 2011, the entire contents of which is hereby incorporated herein by reference.

TECHNICAL DOMAIN OF THE INVENTION

The invention concerns a device for fastening a fluid transport circuit to an element of the structure of an aircraft and the related aircraft. The invention can be advantageously applied for fluid transport circuits containing two concentric tubes, for example an interior fuel line and an external conduit allowing circulation of air between the internal and the external tubing. The term "tubing" indicates a group of several tubes of the same diameter assembled to form a sealed system.

PRIOR ART

Fluid transport circuits are generally attached to structural elements of an aircraft during its construction. The circuit is accomplished in several portions that are assembled to the interior of the aircraft when the structure is being built.

Some fluid transport circuits in aircraft are made up of two tubing elements. Internal tubing transports the fluid, with a space located between the external and internal tubing. This space can be used for flow of another fluid, air or simply as protection of the internal tubing.

Fluid transport circuits with two concentric tubes are more complex to maintain on structures in an aircraft than standard fluid transport circuits, which have only one tube. Standard devices for holding tubes in place generally include a ring clamped around a tube and a metallic plate connected to the ring, with the metallic plate having a mechanical interface with a structural element of the aircraft.

FIG. 1 of the prior art shows a fastening device 10 used to hold in place a tube 12 (shown partially) of a standard tubing type onto an element of the structure of an aircraft (not shown). The fastening device 10 includes a ring 14 clamped onto the tube 12 and connected to a plate 15 using a means of connection 16. The plate 15 and the ring 14 can also be formed as a single piece. The plate 15 has two bores 18 intended for connecting the fastening device 10 to an element of the structure of an aircraft.

These standard fastening devices 10 cannot be used for supporting the heavy weight that tubing and fluids within it can represent. Thus, for each portion of a fluid transport circuit, several fastening devices 10 are necessary. These fastening devices 10 greatly increase the weight of the structure of an aircraft. It is known to reduce the weight of these fastening devices 10 by leaving hollows 19 in the center of the plate 15.

However, as fluid transport circuits that have two tubes are heavier, more fastening devices are required. Multiple fastening devices in each portion complicate installation and maintenance operations of portions of tubing in the fluid transport circuit. In addition, at each fastening device, the risk of cutting the tube is heightened, thus increasing the risk of leaks in the tubing.

Document WO 2007/057629 describes a fastening device between two portions of a fluid transport circuit containing two tubes. The fastening device both functions as a connecting junction between two portions of the fluid transport circuit and as support for the fluid transport circuit. However, this device cannot transmit mechanical forces between the two portions of the fluid transport circuit.

OBJECT OF THE INVENTION

This invention proposes to reduce the number of fastening devices for a fluid transport circuit containing two tubes, an internal tube and an external tube. To this end, the invention proposes a fastening device at the junction of two portions of a fluid transport circuit in order to maintain appreciably constant radial clearance between the tube of the internal tubing and the tube of the external tubing of the two portions. As this device will make the structure of the dual tube fluid transport circuits more rigid, it will thus be possible to reduce the number of connections between the circuits and the aircraft structure.

According to an initial embodiment, the invention concerns a device for fastening a transport fluid circuit to an element of the structure of an aircraft with the fluid transport circuit made up of an external tube positioned around an internal tube.

The device is characterized in that as the fastening device is located at the junction between the two portions of the fluid transport circuit, it contains a body with a plate intended to fix the fastening device to the structural element of the aircraft, with this body capable of providing at least one sealed connection between the external tubes of the two portions and a support system that will guarantee appreciably constant radial clearance between the internal tube and the external tube of the two portions of the fluid transport circuit.

This invention will allow the fastening device to serve as both a hydraulic connection between two portions of the fluid transport circuit and as support for the fluid transport circuit. The support function implies mechanical continuity between the two portions of the fluid transport circuit to ensure the transmission of actions involving mechanical actions, forces and moments, between the portions of the circuit and between the said portions and the structure to which they are attached.

As such, the device can be used to significantly reduce the number of fastening devices of a portion of the fluid transport circuit. Reducing the number of fastening devices decreases the risk of cuts in the tubing, and therefore the risk of leaks. Not only does the invention facilitate installation and maintenance of the fluid transport circuit, it also reduces the weight allotted to fastening the fluid transport circuit.

In one embodiment, the support system is made up of an added junction mechanism attached to the internal tube that links the internal tube to the end piece of the body.

In one embodiment, the body contains a cylindrical part connected to the plate with a diameter appreciably equal to the diameter of the external tube of a portion, with the cylindrical part intended to be welded to an end of the an external tube of a portion.

In one embodiment, the body containing an internal junction passing through the body with a diameter appreciably equal to the diameter of the internal tube of the portions and the support system is formed by at least one spacer piece located between the body and the internal junction, with the body, the internal junction and the spacer piece forming a single piece.

In one embodiment, the body, the internal junction and the spacer piece are molded.

In one embodiment, the fastening device is made of a conductive material that provides electrical continuity between the two portions and the structure of the aircraft when these portions are made of conductive materials.

In one embodiment, the plate contains a mechanical interface that can attach to a sleeve when the end of an external tube of a portion is made up by a sleeve. The sleeve is used to access the mechanical junction between the internal tubes of the portions of the circuit during installation of the tubing in the structure of the aircraft.

In a second embodiment, the invention concerns a device for fastening a fluid transport circuit to an element of the structure of an aircraft.

BRIEF DESCRIPTION OF DRAWINGS

The invention will be better understood by reading the following description and reviewing the accompanying drawings. These drawings are provided only as an illustration and under no circumstances limit the invention. They show the following.

The Figures are not to scale.

Identical, similar or analogous elements keep the same reference from one figure to the next.

DESCRIPTION OF EXAMPLES OF
EMBODIMENTS OF THE INVENTION

Figure 4:
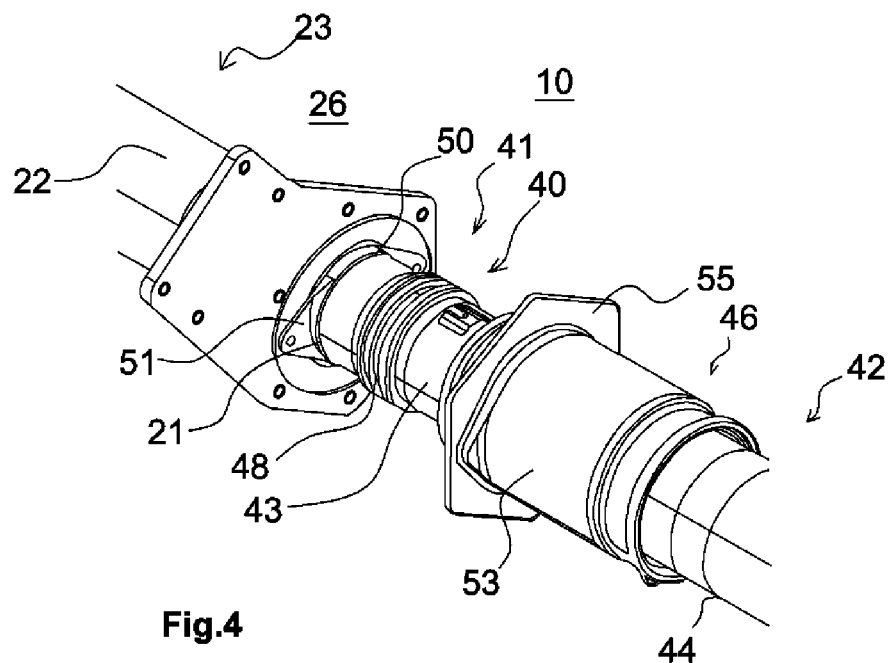
FIG. 4: A three-dimensional view of a connection phase of two portions of a fluid transport circuit with the fastening device in FIG. 2.

FIG. 4 shows a three-dimensional view of an initial portion 23 and of a second portion 42 of a fluid transport circuit. Each of these portions 23 and 42 contains an internal tube 21 and 43 surrounded by an external tube 22 and 44. A fastening device 10 according to the invention links these two portions 23, 42 to the fluid transport circuit. The fastening device 10 includes a body 26 and a connecting system 41.

Figure 1:
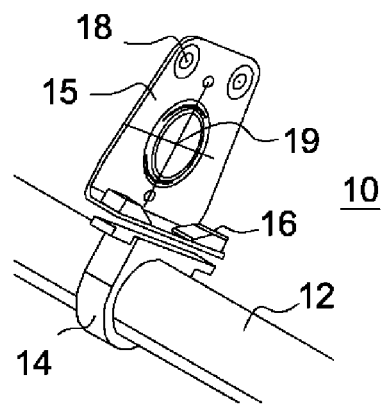
FIG. 1 (prior art described previously): A three-dimensional view of the prior art of a fastening device.
Figure 2:
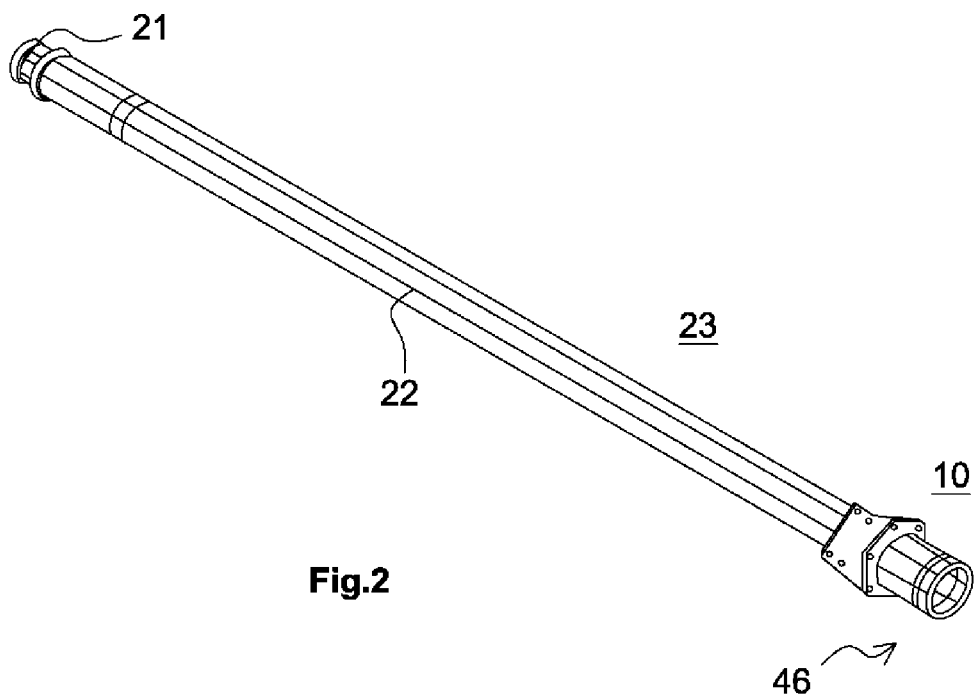
FIG. 2: a three-dimensional view of a portion of a fluid transport circuit whose internal or external tubes are connected to a fastening device in an initial embodiment of the invention.
Figure 3:
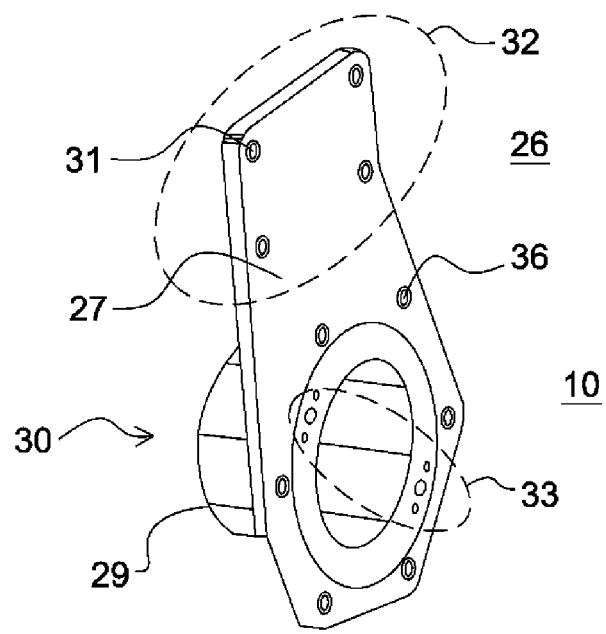
FIG. 3: A three-dimensional view of the fastening device in FIG. 2.

As detailed in FIGS. 2 and 3, the body 26 is equipped with a plate 27 mechanically connected to a cylindrical part 29 having one form of revolution. The diameter of the cylindrical part 29 is appreciably equal to the diameter of the external tube 22 of the portion 23 such that the external tube 22 is attached to the end 30 of the circular interface 29, for example by a solder fillet. When the portion 23 fits into with the fastening device 10, the internal tube 21 of the portion 23 penetrates the interior of the cylindrical part 29 and extends beyond the fastening device 10 up to a connection 40 with another internal tube 43 of another portion 42. The connection 40 constitutes a means of fastening that connects the internal tubes 21, 43 mechanically, achieving a mechanical connection in addition to a sealing function.

The plate 27 has a mechanical interface 32 intended for connecting the fastening device 10 to an element of the structure of an aircraft. To this end, the plate 27 has four bore holes 31 for allowing the means of fixing by either screw or bolt. The plate 27 also contains a mechanical interface 33 (detailed in FIG. 4) that can be fixed to the connecting system 41 attached to the internal tube 21. Moreover, the plate 27 also has a mechanical interface 36 for fastening a sleeve 46 to the external tube 44 of the second portion 42.

Preferably, the fastening device 10 is made of a conductive material that provides electrical continuity between the tubes and/or the structure of the aircraft. Electrical conductivity of the tubes and/or the aircraft structure allows ESN electrical functions in a network, ensuring electric functionalities such as return current and grounding of various electrical equipment installed in the aircraft.

Figure 6:
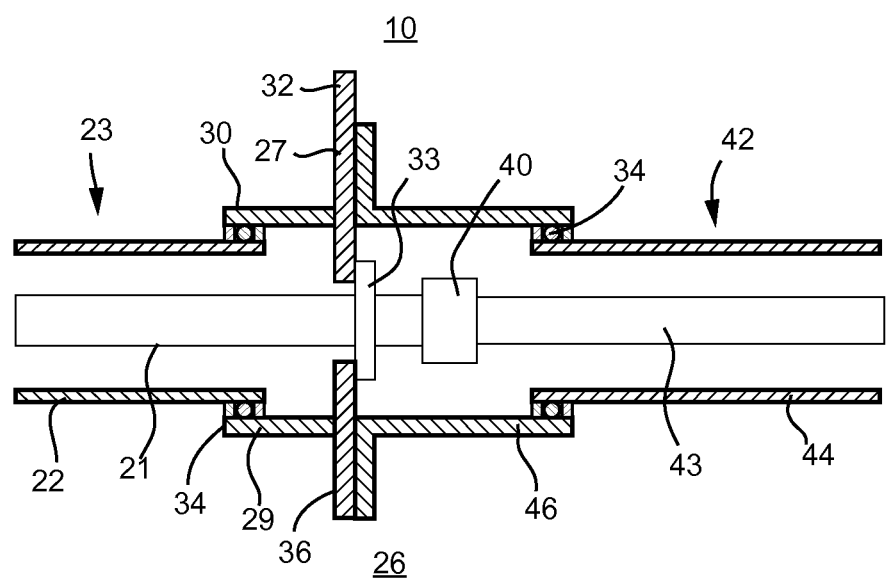
FIG. 6: A schematic and partial cross-sectional drawing of a fastening device according to the invention.

FIGS. 4 and 6 show the fastening device 10 connected to the first portion 23 by the external tube 22 being connected to an end 30 of the cylindrical part 29. External tube 22 may be connected to end 30 of cylindrical part 29 by means of a weld (not shown). FIG. 6 shows an annular seal 34 between the cylindrical part 29 and the external tube 22. FIG. 4 clearly shows that the connecting system 41 includes a ring 50 clamping the internal tube 21 so as to immobilize the connecting system 41 onto the internal tube. The connecting system 41 contains two protrusions 51 of the same material as the ring 50, for example in triangular form. These two protrusions 51 have through bores coaxial to the bores of the mechanical interface 33 in one side of the body end 26 to allow fastening of the connecting system 41 to the end side of the body 26. The connecting system 41 constitutes, in this embodiment, a support system that guarantees radial clearance between the internal tube 21 and the external tube 22.

Figure 5:
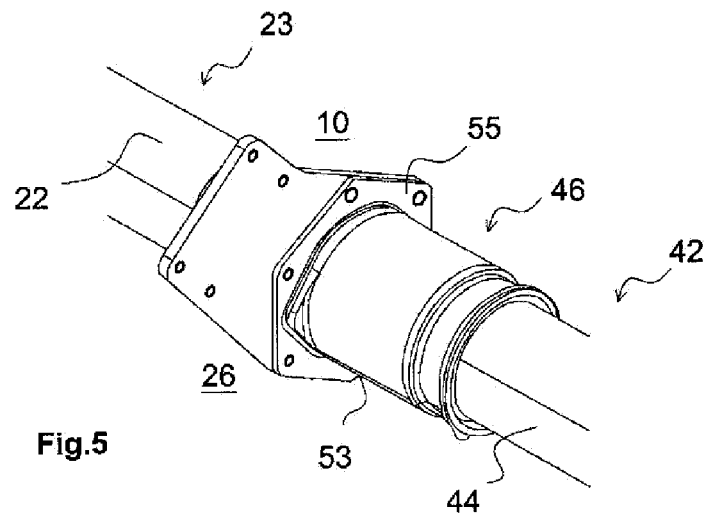
FIG. 5: A three-dimensional view of another assembly phase of two portions of a fluid transport circuit with the fastening device in FIG. 2.

In addition, we can see the internal tube 43 of the second portion 42 is connected to the internal tube 21 of the first portion 23 by means of a sealed connection 40. In the example of FIG. 4, the sealed connection 40 contains a connector 48 surrounding the internal tubes 21, 43. A sleeve 46 set around the external tube 44 of the second portion 42 is used to protect the sealed connection 40 and to facilitate installation and maintenance operations of the portions 23, 42 between them. The sleeve 46 has a circular body 53 installed around the external tube 44 of the second portion 42. The sleeve 46 also has a mechanical interface 55 in the shape of a flange, that has an hexagonal shape seen from the front, and has been adapted to fit into the mechanical interface 36 of the fastening device 10. The sleeve 46 is shown as assembled in FIG. 5, meaning when the mechanical interface 55 is attached to the mechanical interface 36 by means of a fastening system, such as a screw or bolt.

The assembly process of the two portions 23, 42 of the fluid transport circuit to the fastening device 10 contains a phase of fastening the body 26 to the external tube 22 of the first portion 26, for example by a solder fillet. In a variant, the end of the external tube 22 containing a sleeve, said sleeve is assembled with a dedicated mechanical interface onto the body 26. Another stage of assembly consists in fastening the connecting system 41 to the internal tube 21. The internal tube 21 is introduced into the interior of the circular body 29 of the body 26, then to the interior of the external tube 22 until the connecting system 41 comes into contact with the side of the body end 26. The connecting system 41 is connected to the body 26 by implementing a means of fastening. The internal tube 43 of the second portion that is surrounded by the external tube 44 is connected to the internal tube 21 of the first portion 23 by implementing the connection 40. The sleeve 46 surrounding the external tube 44, as in FIG. 4, is translated along the external tube 44 so as to come into contact with the mechanical interface 36 of the body 26. A fastening system is used to mechanically connect the flange 55 of the sleeve 46 to the mechanical interface 36.

During maintenance on the connection 40 located between the two internal tubes 21, 43, for example in the event of a leak, the fastener is removed between the mechanical interface 36 and the flange 55 of the sleeve 46. The sleeve 46 is translated to access the connection 40. Personnel can thus easily work on the connection 40 without having to disassemble numerous elements of the fluid transport circuit.

Figure 7:
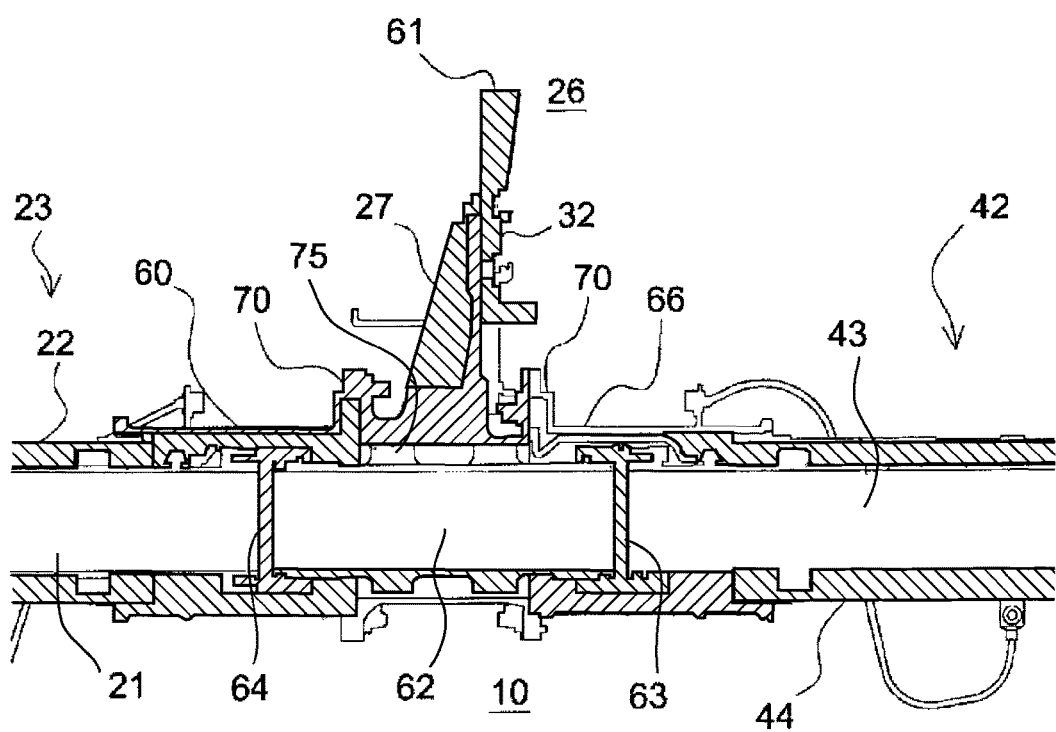
FIG. 7: A sectional view of the connection between two portions of a fluid transport circuit and a fastening device in a second embodiment of the invention.

FIG. 7 shows a sectional view of a second embodiment of the invention in which the fastening device 10 contains a body 26 with a plate 27 intended to be fastened to an element 61 of the aircraft structure represented partially via the mechanical interface 32. The fastening device 10 also contains an internal junction 62 of a cylindrical shape passing through the body 26 of the fastening device 10 to whose ends the two internal tubes 21, 43 of portions 23, 42 are connected. To this end, the internal junction 62 has a diameter appreciably equal to the internal tubes 21, 43. The internal tube 21 is connected to the internal junction 62 by means of a sealed connection 64 located between one end of the internal junction 62 and an end of the internal tube 21. Likewise, the internal tube 43 is connected to internal junction 62 by means of a sealed connection 63 at the end of the internal junction 62 and at the end of internal tube 43.

The two external tubes 22, 44 of the two portions 23, 42 are connected to the ends of the cylindrical body by means of sleeves 60, 66 located above the connections 63, 64 so as to allow easy access to the said connections 63, 64. For this purpose, the sleeves 60, 66 are attached to the body ends 26 by two mechanical interfaces 70 of the screw and bolt type. The connections 63, 64 constitutes a means of fastening that connects the internal tubes 21, 43 mechanically, achieving a mechanical connection in addition to a sealing function.

Radial clearance is guaranteed between the internal tube 21, 43 and the external tube 22, 44 of each portion 23, 43 by means of a spacer piece 75 positioned around the internal junction 62 between the body 26 and the internal junction 62. The spacer piece 75 has openings allowing air or fluid to circulate in the space between the two tubes. The body 26, the internal junction 62 and the spacer piece 75 form one single and like piece, preferably manufactured by molding.

The assembly procedure of the two portions 23, 42 of the fluid transport circuit with the fastening device 10 contains a connecting phase of the internal tube 21 to the internal junction 62 by implementing the connection 64. Likewise, the implementation of the connection 63 allows a connection between the internal tube 43 and the internal junction 62. The sleeve 60 surrounding the external tube 22 is translated along the external tube 22 so as to come into contact with the mechanical interface 70 of the body 26. A means of fastening is implemented to mechanically connect the flange of the sleeve 60 with the mechanical interface 70. In the same way, the sleeve 66 surrounding the external tube 22 is translated along the external tube 22 so as to come into contact with the mechanical interface 70 of the body 26. A means of fastening is implemented to mechanically connect the flange of the sleeve 66 with the mechanical interface 70.

During maintenance of one of the connections 63, 64 between an internal tube and the internal junction 62, for example in the event of a leak, the corresponding fastener is removed between the mechanical interface 70 and the flange of the corresponding sleeve. The sleeve is translated to allow access to the connection 63, 64 so that personnel can easily work on the connection without having to disassemble numerous elements of the fluid transport circuit.

In the two embodiments shown, the fastening device 10 is therefore used to support the two portions 23, 42 of the fluid transport circuit and to guarantee a predetermined space between the two tubes 21, 22, 43, 44 of the two portions 23, 42 of the fluid transport circuit.

The invention claimed is:

1. A circuit for the transport of a fluid in an aircraft, the circuit comprising:
    a first portion including a first internal tube surrounded by a first external tube,
    a second portion including a second internal tube surrounded by a second external tube,
    a fastening device including a body including a plate and a first cylindrical part attached to the plate,
    the first cylindrical part being attached to the first external tube via a sealed connection and to the first internal tube by a connecting system so that the first internal tube extends through and beyond the first cylindrical part up to a connector which mechanically connects together the first and second internal tubes at a location away from the first cylindrical part, the connecting system constituting a support system that establishes a predetermined space between the first and second internal tubes and the first and second external tubes, respectively, of the first and second portions;
    the plate including a first mechanical interface to affix the plate to a structure of the aircraft and a second mechanical interface to connect the plate to the connecting system, and
    a sleeve including a second cylindrical part, which surrounds the second external tube of the circuit and covers the connector mechanically connecting together the first and second internal tubes, and a flange fastened to the second cylindrical part for fastening to the plate, and
    wherein the connecting system includes a ring for clamping the connecting system to the first internal tube of the first portion and a plurality of protrusions to allow fastening of the connecting system to a side of one end of the body.

2. The circuit according to claim 1, in which the first cylindrical part of the body is attached to an end of the first external tube of the first portion.

3. The circuit according to claim 1, in which the fastening device is made of a conductive material.

4. The circuit of claim 1 further comprising an annular seal between the first cylindrical part and the first external tube.

5. The circuit of claim 1, wherein the fastening device is made of a conductive material that provides electrical continuity between the tubes and/or the structure of the aircraft.

6. A device for the transport of a fluid in an aircraft, the device comprising:
    a pipe assembly including at least first and second internal pipes within corresponding at least first and second external pipes;
    a fastening assembly which fastens the pipe assembly to a structure of the aircraft, the fastening assembly including:
    a plate comprising a mechanical interface region fixed to the structure of the aircraft and a pipe interface region which receives the pipe assembly;
    an opening in the pipe interface region of the plate having a diameter no smaller than an outside diameter of the at least first and second internal pipes and no greater than an outside diameter of the at least first and second external pipes;

a cylindrical sleeve concentric with the opening and having a diameter greater than the outside diameter of the at least first and second external pipes, wherein the cylindrical sleeve is fixed to the pipe interface region of the plate and which receives one of the at least first and second external pipes, the cylindrical sleeve being attached to a one of the at least first and second internal pipes corresponding to the external pipe received by the cylindrical sleeve by a connecting system so that the corresponding internal pipe extends through and beyond the cylindrical sleeve up to a connector which mechanically connects together the at least first and second internal tubes at a location away from the cylindrical sleeve, and a mechanical interface bracket abutting the internal pipe and maintaining a radial gap between the internal pipe and the external pipe, wherein the mechanical interface abuts the pipe interface region and only partially blocks an annular region between the internal pipe and the external pipe, and wherein the connecting system includes a ring for clamping the connecting system to the first internal pipe of the pipe assembly and a plurality of protrusions to allow fastening of the connecting system to a side of one end of the cylindrical sleeve.

7. The device of claim 6 further comprising an annular seal between the cylindrical sleeve and the external pipes.

8. The device of claim 6, wherein the fastening assembly is made of a conductive material that provides electrical continuity between the pipes and/or the structure of the aircraft.

9. A circuit for the transport of a fluid in an aircraft, the circuit comprising:

a first portion including a first internal tube surrounded by a first external tube, a second portion including a second internal tube surrounded by a second external tube, a fastening device including a body, a connecting system and a sleeve, the body including a plate and a first cylindrical part attached to the plate, the first cylindrical part being attached to the first external tube via a sealed connection and to the first internal tube by the connecting system so that the first internal tube extends through and beyond the first cylindrical part up to a connector which mechanically connects together the first and second internal tubes at a location away from the first cylindrical part, the connecting system constituting a support system that establishes a predetermined space between the first and second internal tubes and the first and second external tubes, respectively, of the first and second portions;

the plate including a first mechanical interface to affix the plate to a structure of the aircraft and a second mechanical interface to connect the plate to the connecting system, and the sleeve including a second cylindrical part, which surrounds the second external tube of the circuit and covers the connector mechanically connecting together the first and second internal tubes, and a flange fastened to the second cylindrical part for fastening to the plate, and wherein the fastening device body, connecting system and sleeve are made of a conductive material that provides electrical continuity between the tubes and/or the structure of the aircraft.

* * * * *